(12) United States Patent
Gerhardt et al.

(10) Patent No.: US 9,662,938 B2
(45) Date of Patent: *May 30, 2017

(54) FREEWHEEL HUB

(71) Applicant: Christianson Systems, Inc., Blomkest, MN (US)

(72) Inventors: Jim Gerhardt, St. Augusta, MN (US); Shannon Hansen, Bird Island, MN (US)

(73) Assignee: Christianson Systems, Inc., Blomkest, MN (US)

(*) Notice: Subject to any disclaimer, the term of this patent is extended or adjusted under 35 U.S.C. 154(b) by 12 days.

This patent is subject to a terminal disclaimer.

(21) Appl. No.: 14/798,977

(22) Filed: Jul. 14, 2015

(65) Prior Publication Data

US 2015/0314642 A1  Nov. 5, 2015

Related U.S. Application Data

(63) Continuation of application No. 13/763,848, filed on Feb. 11, 2013, now Pat. No. 9,102,197.

(51) Int. Cl.
| | |
|---|---|
| *B60B 27/04* | (2006.01) |
| *F16D 41/28* | (2006.01) |
| *B60B 27/02* | (2006.01) |
| *F16D 41/24* | (2006.01) |

(52) U.S. Cl.
CPC .......... *B60B 27/047* (2013.01); *B60B 27/023* (2013.01); *F16D 41/28* (2013.01); *B60B 2900/1212* (2013.01); *B60B 2900/212* (2013.01); *B60B 2900/321* (2013.01); *B60B 2900/325* (2013.01); *F16D 41/24* (2013.01); *Y10T 29/49535* (2015.01)

(58) Field of Classification Search
CPC .................. F16D 41/28; B60B 2900/1212
See application file for complete search history.

(56) References Cited

U.S. PATENT DOCUMENTS

| | | |
|---|---|---|
| 1,608,141 A | 11/1926 | Shekerjian |
| 2,211,548 A | 8/1940 | Schwinn |
| 3,301,095 A | 1/1967 | Dotter |
| 3,546,971 A | 12/1970 | Schwerdhofer |
| 3,696,690 A | 10/1972 | Schwerdhofer |
| 3,726,371 A | 4/1973 | Versoy |
| 3,865,220 A | 2/1975 | Thompson, Jr. |
| 3,984,129 A | 10/1976 | Hege |
| 4,170,369 A | 10/1979 | Strutman |
| 4,480,698 A | 11/1984 | Reeves |
| 4,501,575 A | 2/1985 | Lapeyre |
| 4,615,423 A | 10/1986 | Klauke et al. |
| 4,711,331 A | 12/1987 | Hoffmann |
| 5,485,905 A | 1/1996 | Rader, III |
| 5,515,957 A | 5/1996 | McConaghy |
| 5,690,202 A | 11/1997 | Myers |
| 5,964,332 A | 10/1999 | King |
| 6,591,956 B1 | 7/2003 | Neugent |
| 7,108,097 B1 | 9/2006 | Bolton et al. |
| 7,207,584 B2 | 4/2007 | Forderhase |
| 7,328,766 B2 | 2/2008 | Christini et al. |
| 7,487,854 B2 | 2/2009 | Christini et al. |
| 7,854,305 B2 | 12/2010 | Smetana et al. |
| 7,874,955 B2 | 1/2011 | Patterson |
| 8,033,945 B2 | 10/2011 | Patterson |
| 8,056,693 B2 | 11/2011 | Christini et al. |
| 9,102,197 B2 * | 8/2015 | Gerhardt ............ F16D 41/28 192/64 |
| 2003/0101786 A1 | 6/2003 | Plesh, Sr. |
| 2005/0029071 A1 | 2/2005 | Hsu |
| 2007/0199788 A1 | 8/2007 | Chen |

OTHER PUBLICATIONS

GMN Paul Muller Industrie GmbH & Co. KG, *Sprag-Type Freewheel-Clutches*, Catalogue No. 9050, Jul. 2006, 28 pages.

* cited by examiner

*Primary Examiner* — Mark Manley

(74) *Attorney, Agent, or Firm* — Merchant & Gould P.C.

(57) ABSTRACT

The present disclosure provides a bicycle hub that provides improved drive line efficiency and bike-to-rider torque feedback. The drive line efficiencies are due to lower rolling resistance resulting from a novel bearing and sprag clutch configuration, a lightweight design, and immediate torque transfer from the cassette drive to the hub body. The bike-to-rider feedback has been improved as the torque transfer is smooth, predictable, and immediate.

22 Claims, 9 Drawing Sheets

US 9,662,938 B2

FREEWHEEL HUB

TECHNICAL FIELD

A freewheeling bicycle hub including a sprag type clutch configuration.

BACKGROUND

Freewheeling bicycle hubs are generally known. For example, U.S. Pat. No. 2,211,548 to Frank W. Schwinn issued on Jun. 24, 1940 is directed to a freewheeling bicycle hub configuration. Freewheeling bicycle hubs are configured to enable rotation of the pedals to drive the rotation of the wheels while also allowing the wheels to rotate independent of the rotation of the pedals. This functionality enables the pedals of the bike to be held stationary while the wheels rotate as the bike coasts. Freewheeling bicycle hubs are also commonly referred to as coaster hubs.

SUMMARY

The present disclosure provides a bicycle hub that provides improved drive line efficiency and bike-to-rider torque feedback. The drive line efficiencies are due to lower rolling resistance resulting from a novel bearing and sprag clutch configuration, a lightweight design, and immediate torque transfer from the cassette drive to the hub body. The bike-to-rider feedback has been improved as the torque transfer is smooth, predictable, and immediate.

DETAILED DESCRIPTION

Figure 1:
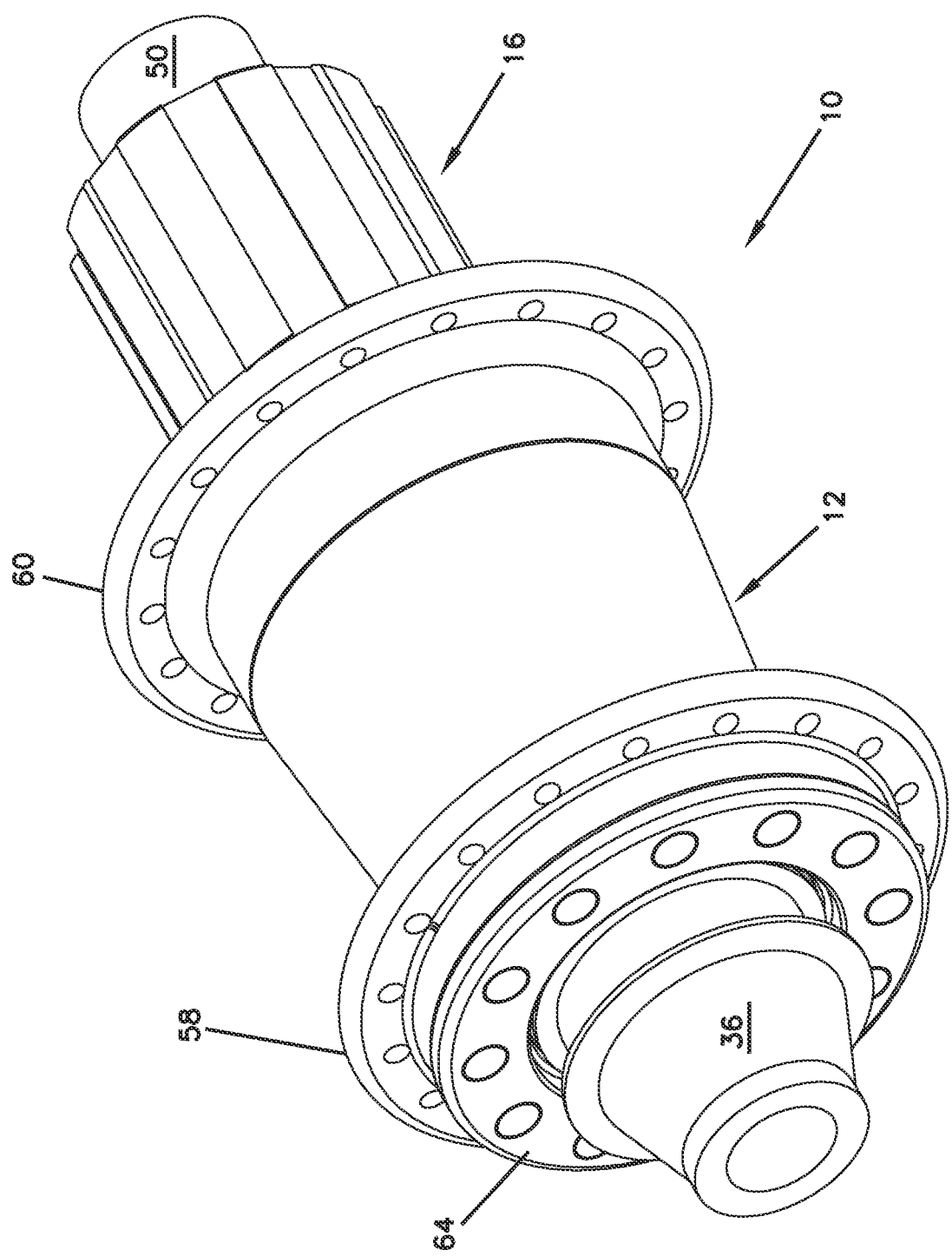
FIG. 1 is an isometric view of a hub according to the principles of the present disclosure.
Figure 2:
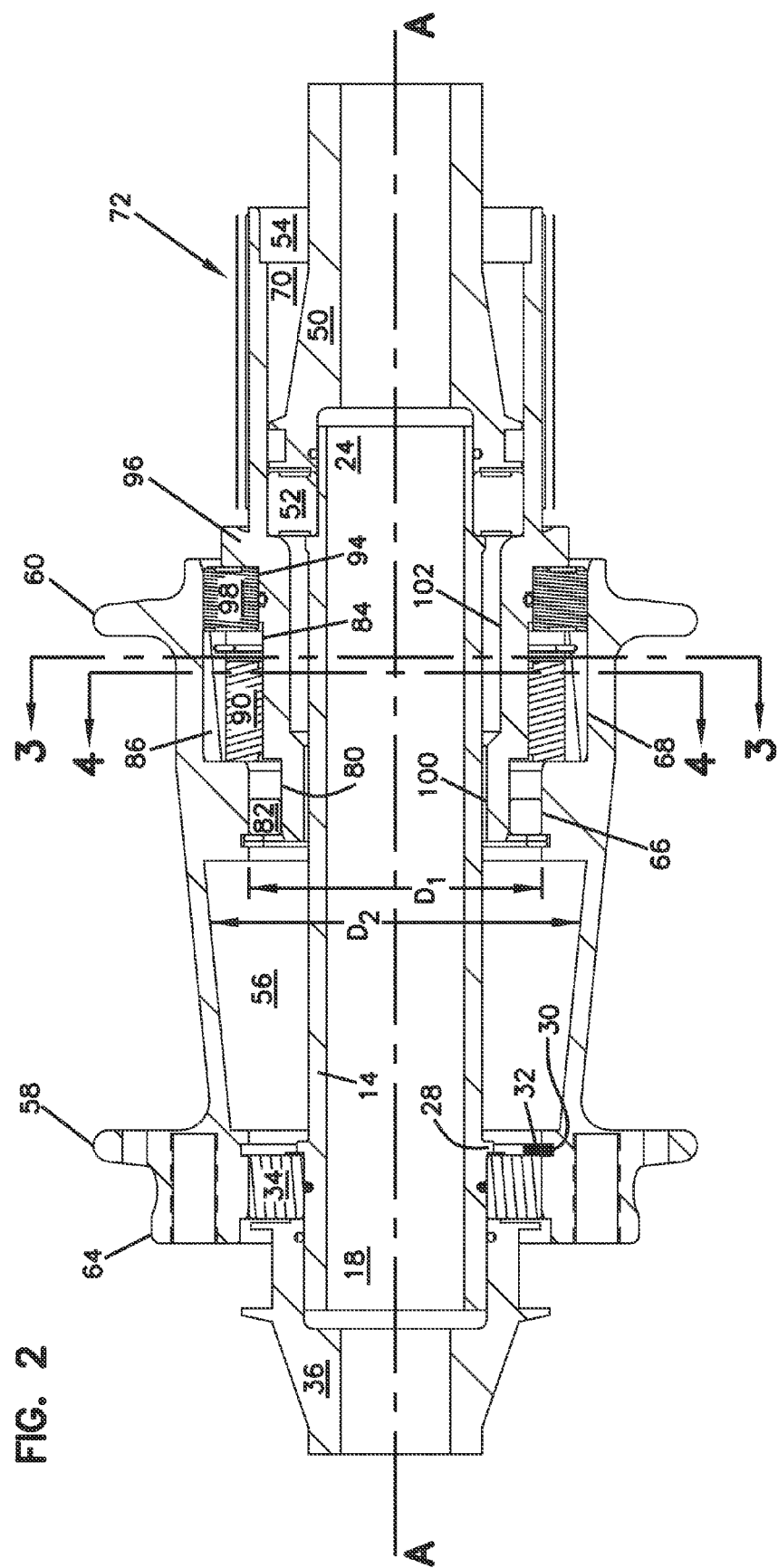
FIG. 2 is a longitudinal cross-sectional view of the hub of FIG. 1.
Figure 3:
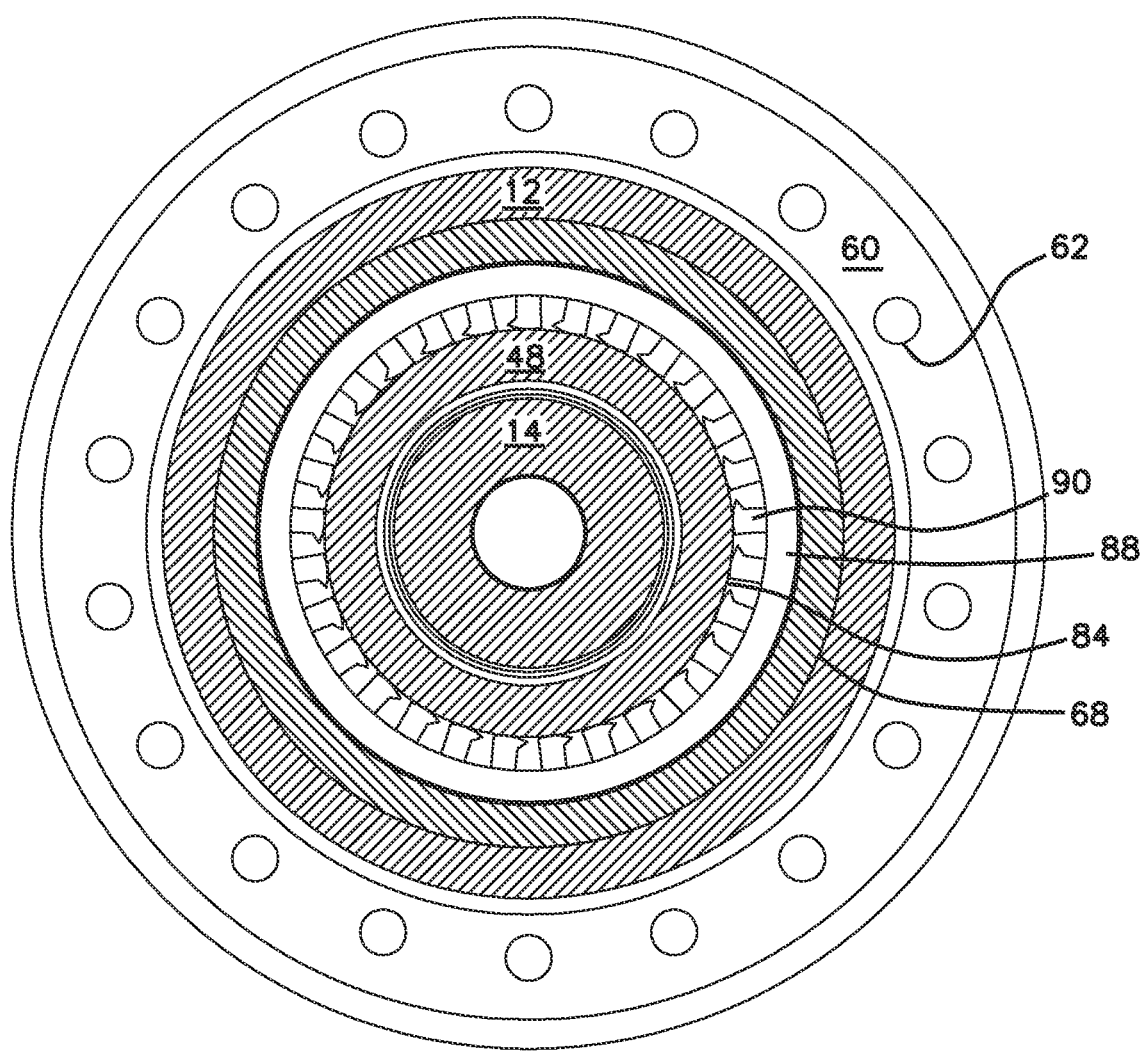
FIG. 3 is a cross-sectional view of the hub along line 3-3 of FIG. 2.
Figure 4:
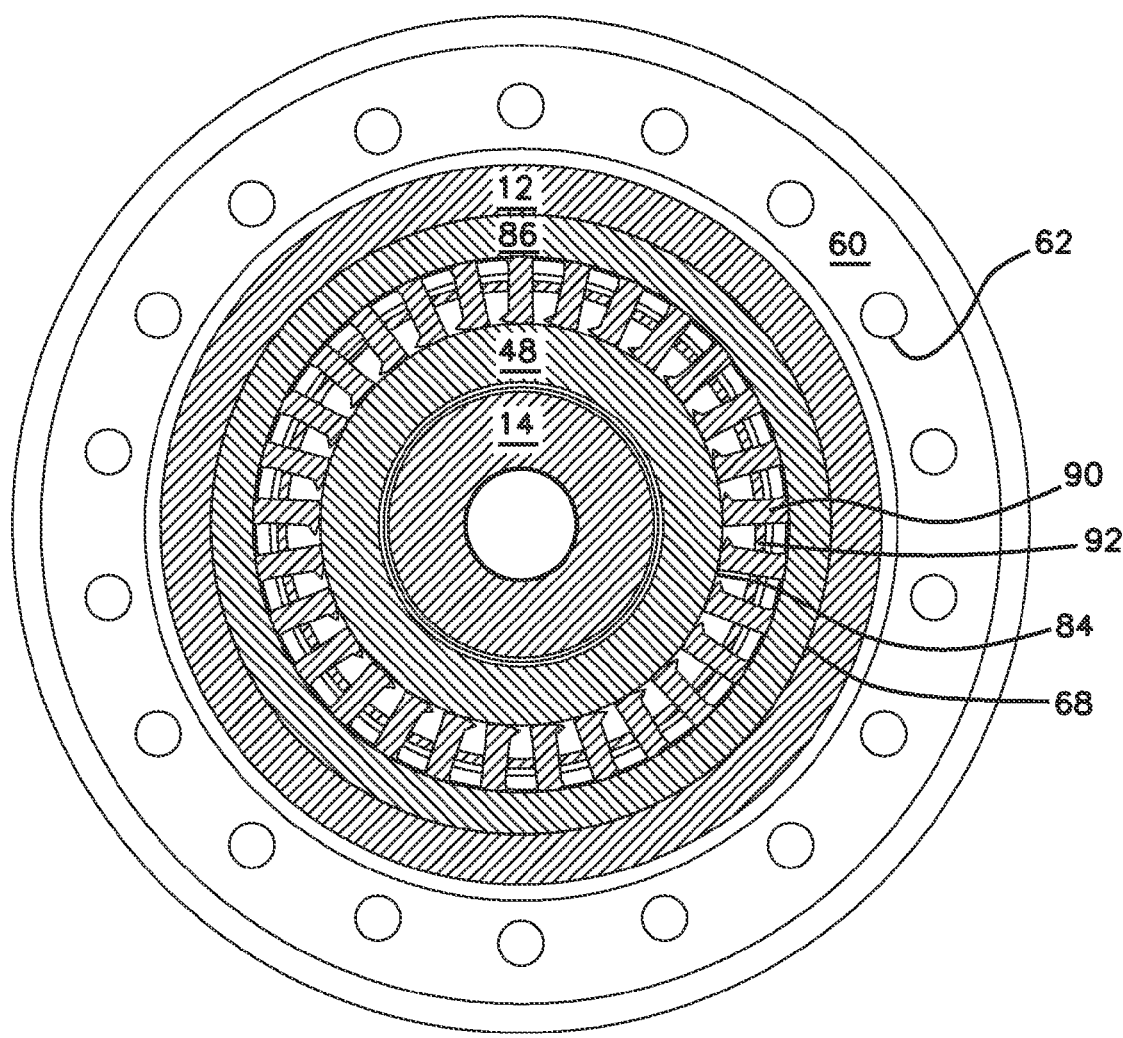
FIG. 4 is a cross-sectional view of the hub along line 4-4 of FIG. 2.
Figure 5:
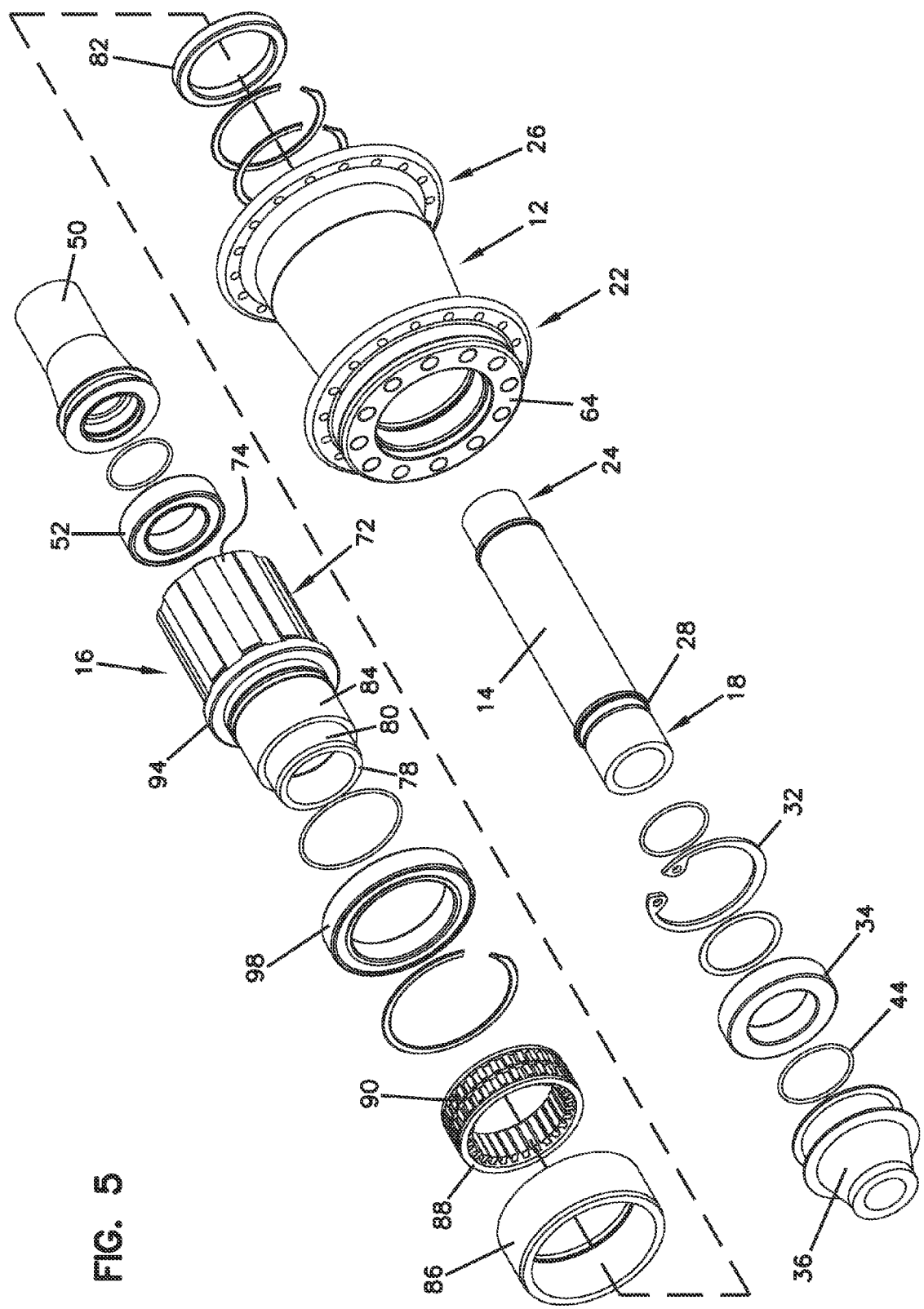
FIG. 5 is an exploded assembly view of the hub of FIG. 1.

Referring to FIG. 1, a first embodiment of a hub according to the present disclosure is shown. In the depicted embodiment, the hub 10 includes a hub body 12, an axle 14, and cassette driver 16. In the depicted embodiment, the hub 10 is configured to freewheel. In other words, a cassette driver 16 rotates with the hub body 12 when the wheel is driven by the cassette driver 16 and the cassette driver 16 rotates relative to the hub body 12 when the wheel is coasting (rotating and not being driven).

Referring to FIGS. 2-5 and 9, the configuration of hub 10 is described in greater detail. In the depicted embodiment the hub 10 is configured for use with multiple speed bicycles (e.g., road bikes, mountain bikes, etc.) that utilize an external cassette driven by a chain. In the depicted embodiment the axle 14 is co-axially arranged within the hub body 12. In particular, the axle 14 extends through the hub body 12. The axle 14 includes a first end portion 18 that is positioned within the first end portion 22 of the hub body 12 and a second opposed end portion 24 that includes a portion that extend outwardly from the second end 26 of the hub body 12.

In the depicted embodiment, the first end portion 18 of the axle includes a shoulder 28. The hub body 12 includes a snap ring groove 30 aligned with the shoulder 28 in a radial direction such that a snap ring 32 and the shoulder 28 cooperatively limit the axial movement of a bearing set 34 in a direction toward the second end 26 of the hub body 12. The bearing set 34 engages an exterior surface of the axle and an interior surface of the internal cavity 56 of the hub body 12. In the depicted embodiment a spacer 36 covers the first end 38 of the axle. In the depicted embodiment a first o-ring 44 seals the interface between the spacer 36 and the axle, and a second o-ring 46 seals the interface between the bearing set 34 and the axle.

In the depicted embodiment, the second end portion 24 of the axle 14 is co-axially arranged within both the hub body 12 and drive end portion 48 of the cassette driver 16. In the depicted embodiment a portion of the second end portion 24 of the axle 14 extends into the driven end of the cassette driver and is connected to a spacer 50. In the depicted embodiment, the second end of portion 24 of the axle 14 interfaces with the cassette driver 16 via bearing set 52. The spacer 50, which is secured to the axle 14, interfaces with the cassette driver 16 via bearing set 54.

In the depicted embodiment, the hub body 12 includes a one-piece construction. The hub body 12 is machined from a single piece of aluminum (e.g., aluminum 7075TC51). The hub body 12 defines a longitudinal rotational axis A-A. The hub body 12 includes an internal cavity 56 that receives the axle 14 as well as the drive end portion 48 of the cassette driver 16. The hub body 12 includes a first radially extending flange 58 located at the first end portion 22 of the hub body 12, and a second radially extending flange 60 located at the second end of the hub body. Each of the radially extending flanges 58, 60 includes a plurality of spaced apart through apertures 62 that are configured to secure spokes. Adjacent the first radially extending flange 58 is a disk brake mount flange 64 configured to support a disk of a disk brake system. The external cylindrical body of the hub body 12 tapers from the second flange 60 towards the first flange 58. In other words, the exterior diameter of the hub body 12 adjacent the second flange 60 is greater than the exterior diameter of the hub body 12 adjacent the first flange 58.

In the depicted embodiment, the wall thickness of the hub body 12 is greater in the portion that radially overlaps the drive end portion 48 of the cassette driver 16 as compared to the portion that does not overlap the cassette driver 16. In the depicted embodiment the internal cavity 56 of the second end portion 26 of the hub body defines two internal cylindrical surfaces. A first cylindrical surface 66 is defined as being a distance D1 from the longitudinal rotational axis A-A, and a second cylindrical surface 68 is defined as being a distance D2 from the longitudinal rotational axis A-A. In the depicted embodiment D2 is greater than D1 and the first surface 66 is closer to the first end portion 22 of the hub body 12 than the second cylindrical surface 68. In the depicted embodiment, the hub body is machined in a process whereby the hub body is not removed from a spindle until both the first and second cylindrical surfaces 66, 68 are drilled.

In the depicted embodiment the cassette driver 16 includes an internal cavity 70 that extends from a drive end portion 48 to an opposed driven end portion 72. The cavity receives the axle 14, which extends into the drive end portion 48 of the cassette driver 16. The cassette driver 16 defines a longitudinal axis of rotation that is coaxial and coincident with the axis of rotation A-A of the hub body 12. In the depicted embodiment, the driven end 72 includes a cylindrical body with a plurality of axially extending grooves 74, which are configured to engage cassette comprised of sprockets and spacers.

In the depicted embodiment the drive end 48 of the cassette driver 16 includes a plurality of coaxial cylindrical surfaces that are positioned within the hub body 12 opposite the internal cylindrical surfaces 66, 68 of the hub body 12. In the depicted embodiment an annular snap ring groove 76 is located in the first cylindrical surface 66 of the inner cavity 56 of the hub body 12 opposite an end face 78 of the drive end portion 48 of the cassette driver 16. A first cylindrical surface 80 extends from the end face 78 of the cassette driver towards the driven end 72 of the cassette driver 16. The first cylindrical surface 80 of the drive end 48 together with the first cylindrical surface 66 defines a first annular cavity that receives bearing set 82 that interfaces between the drive end 48 of the cassette driver 16 and the hub body 12.

In the depicted embodiment a second cylindrical surface 84 having a larger diameter than the first cylindrical surface 80 extends from the first cylindrical surface 80 towards the driven end 72 of the cassette driver 16. The second cylindrical surface 84 of the drive end 48 together with the second cylindrical surface 68 defines an annular cavity that receives a sprag clutch assembly. In the depicted embodiment the surface finish of the second cylindrical surface 84 is less than or equal to Rz of 2.5 micrometers and has a HRC hardness of 60. In the depicted embodiment, the second cylindrical surface 84 has a diameter of greater than 22 mm (e.g., 29 mm). In the depicted embodiment the second cylindrical surface is constructed of a 5210 bearing race type steel. In the depicted embodiment the drive end portion 48 of the drive cassette 16 is precision ground and subsequently hardened, thereby enabling it to act as a force bearing surface for the sprags.

In the depicted embodiment the sprag clutch assembly includes a sprag sleeve 86, a sprag retaining cage 88, sprags 90, and a tensioning band 92. In the depicted embodiment the surface finish of the inside surface of the sprag sleeve is less than or equal to Rz of 2.5 micrometers and the inside surface of the sprag sleeve has a HRC hardness of 60. In the depicted embodiment, the sprag sleeve 86 has a diameter of less than 40 mm (e.g., 37 mm). The sprag sleeve has a height dimension that is greater than the height dimension of the sprag retaining cage 88. The sprag sleeve 86 includes a snap ring groove that receives a snap ring that limits the axial movement of the sprag cage 88 in the axial direction towards the driven end 72 of the cassette driver. Axial movement of the sprag cage 88 in the direction towards the first cylindrical surface 80 of the driven end 48 of the cassette driver 16 is limited by contact with the bearing set 82. In the depicted embodiment the sprag sleeve is constructed of a 5210 bearing race type steel which is pressed fit/interference fit into the second cylindrical surface 68 of the hub body 12. In the depicted embodiment the sprag sleeve 86 overlaps the second flange 60 in the radial direction. The construction of the sprag sleeve 86 and the hub body 12 cooperatively provide the structural stiffness needed for reliable and long lasting operation of the hub despite the strong radial forces that are generated by the sprags 90. The sprags and sprag cages used in the depicted embodiment are currently available commercially from GMN Paul Müller Industrie GmbH & Co. KG.

In the depicted embodiment a third cylindrical surface 94 extends coaxially from the second cylindrical surface 84 towards the driven end 72 of the cassette driver 16. The third cylindrical surface 94 has a diameter that is greater than the diameter of the second cylindrical surface 84. A shoulder 96 is provided on the cassette driver 16 between the third cylindrical surface 94 and the driven end 72 of the cassette driver 16. The third cylindrical surface 94 of the drive end 48 of the cassette driver 16 together with the second cylindrical surface 68 defines a first annular cavity that receives bearing set 98 that interfaces between the drive end 48 of the cassette driver 16 and the hub body 12. The shoulder 96 limits axial movement of the bearing set 98 in the direction towards the driven end 72 of the cassette driver 16. An end face of the sprag sleeve 86 limits axial movement of the bearing set 98 on the axial direction towards the first cylindrical surface 80 of the drive end 48 of the cassette driver 16. In the depicted embodiment the third cylindrical surface 94 includes an annular o-ring groove configured to receive an o-ring that seals the interface between the third cylindrical surface 94 and the bearing set 98.

In the depicted embodiment the, the internal cavity of the drive end 48 of the of the cassette driver includes a first cylindrical surface 100 defined by a first diameter that is greater than the diameter of the axle, and a second cylindrical surface 102 defined by a second diameter that is greater than the first diameter, the second cylindrical surface being closer to the driven end of the cassette driver than the first cylindrical surface. The configuration results in further weight savings and strength of the cassette driver and facilitates precision manufacturing thereof.

In the depicted embodiment the configuration results in a high performance hub as it has the strength and durability to withstand intense use while also being lightweight and smooth in operation. The hub body 12 is constructed of lightweight, relatively softer aluminum material and it is designed so that it can be manufactured with high precision as the above-referenced cylindrical surfaces 66, 68 can be machined without detaching the hub body 12 from the chuck that holds the part during machining. The hard and robust sprag sleeve 86 is pressed into the softer aluminum. The pressing process creates a tight interference fit between the sprag sleeve 86 and cylindrical surface 68. This interface allows the hub body 12 to work together to resist the radial forces generated by the sprags. The sprag sleeve 86 provides the hardened surface that interfaces with the sprags and also provides additional structural strength to the hub. The hub of the depicted embodiment does not require rebuilding and can operate in extreme environments including environments as cold as −50 degrees Fahrenheit.

In the depicted embodiment the sprag cage moves with the cassette driver 16. The tensioning member (e.g., spring) on the sprag cage biases the individual sprags against the cylindrical surface 84 of the cassette driver 16 resulting in the sprag cage being essentially tension mounted to cassette driver 16. The internal ends of the sprags contact the second external surface 84 of the cassette driver and are biased radially outwardly against a spring and extend radially slightly beyond the periphery edge of the sprag cage. This configuration results in little and light contact between the sprags and the sprag sleeve 86 during coasting, which results in a very low friction configuration as the clutch configuration is disengaged during coasting. The non-drive forces applied between the hub body 12 and the cassette driver 16 are transferred through the bearing sets 82, 98 that sandwich the sprag clutch assembly.

In the depicted embodiment as soon as the driven end 72 is rotated in the drive direction at a rotational speed that exceeds the rotational speed in the drive direction of the hub body 12, the sprags engage and lock against the sprag sleeve 86 and transfer torque from the cassette driver 16 to the hub body 12. In the depicted embodiment the sprag clutch assembly transfers torque to drive the hub forward. However, the sprag clutch assembly is not relied on as a bearing set support the relative rotation between the cassette driver 16 and the hub body 12. This configuration results in a clutch configuration that immediately engages when the driven end is driven. For example, in the depicted configuration the driven end cannot be rotated relative to the hub body in the drive direction more than a small amount before it fully engages and transfers torque from the cassette driver 16 to the hub body 12, thereby causing the hub body to rotate with the cassette driver 16. The amount of relative rotation in the drive direction, commonly referred to as play or slop, can be less than five degrees (e.g., less than two degrees, less than one degree, or one half of a degree).

Figure 6:
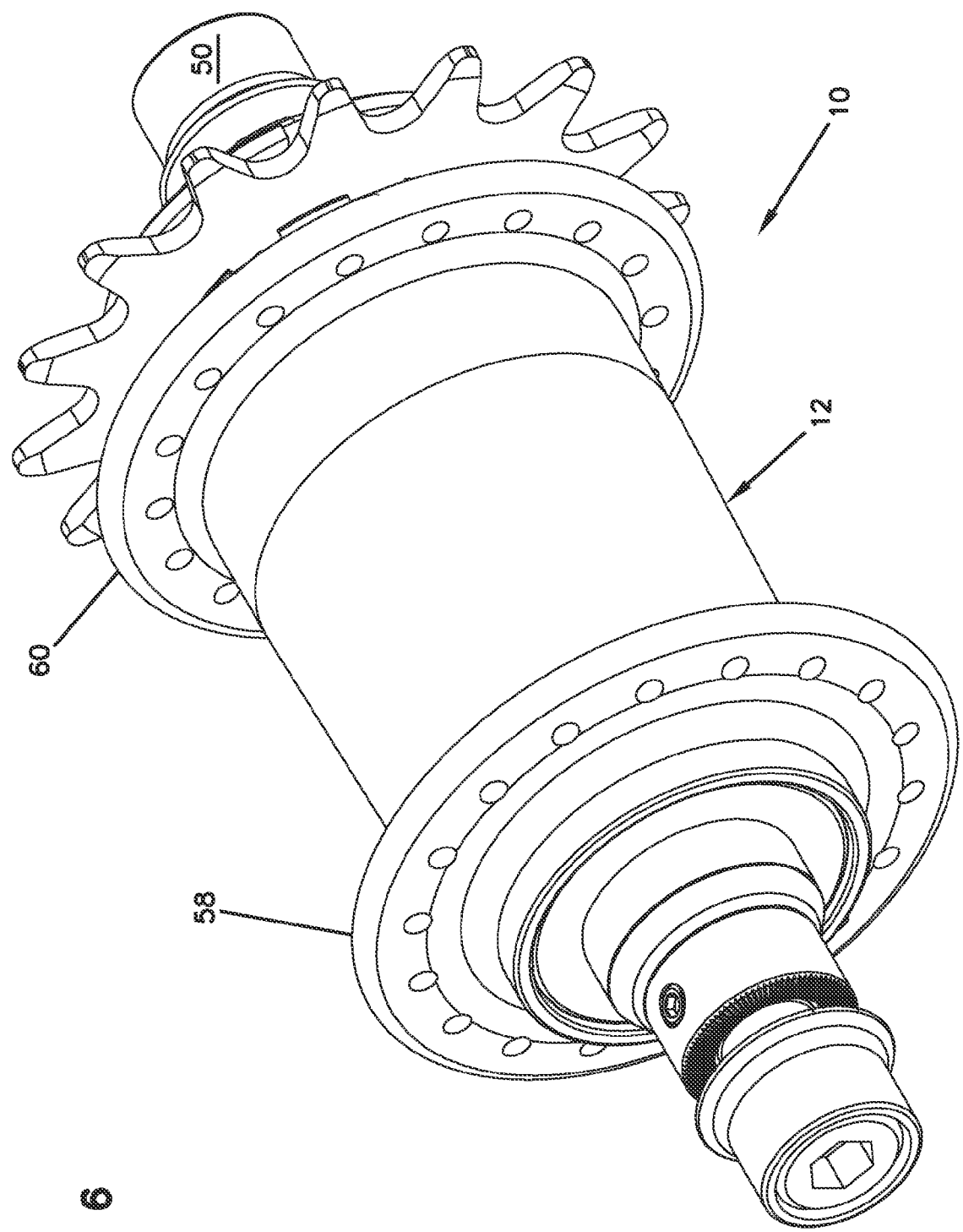
FIG. 6 is an isometric view of an alternative embodiment of the hub of FIG. 1.
Figure 7:
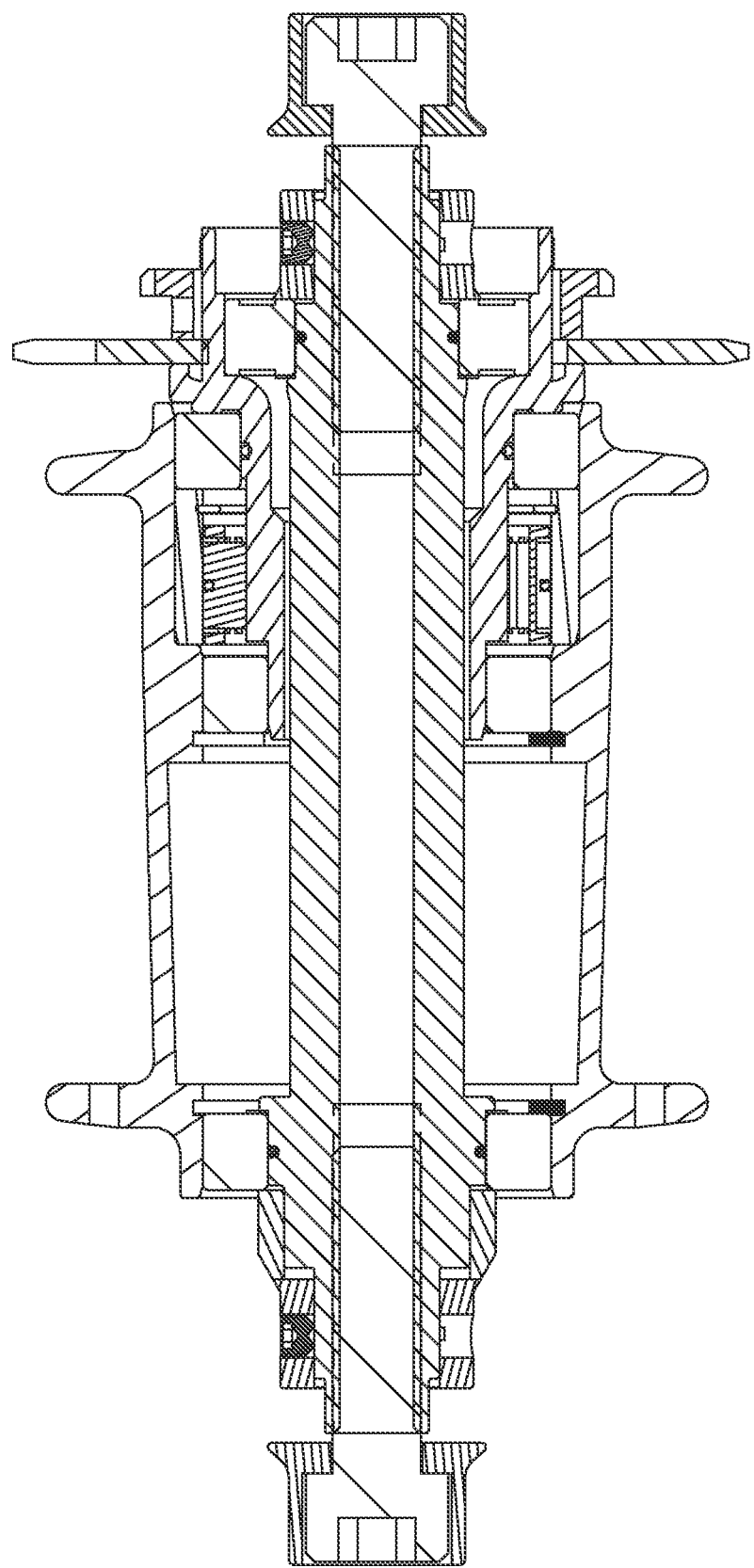
FIG. 7 is a longitudinal cross-sectional view of the hub of FIG. 6.
Figure 8:
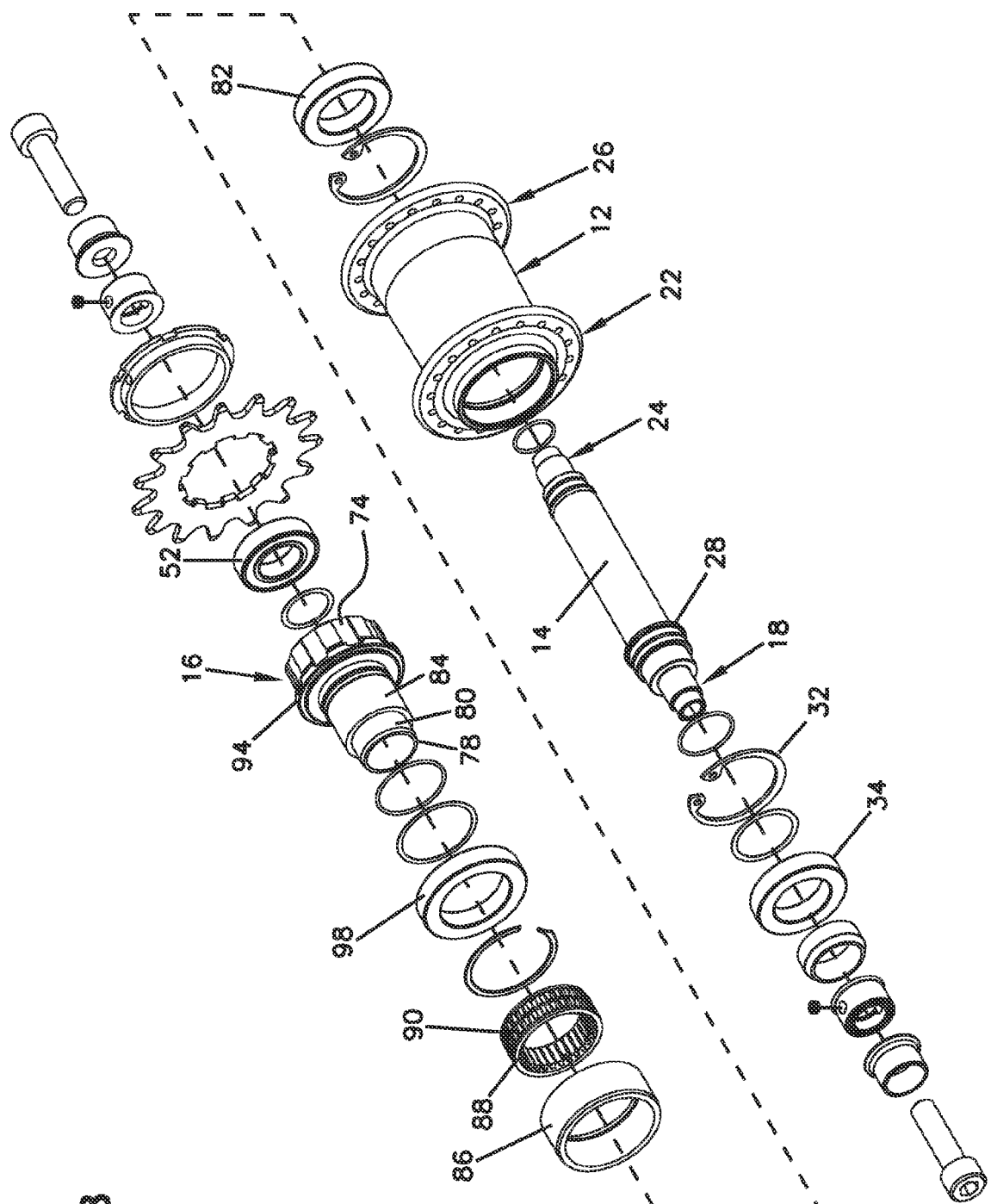
FIG. 8 is an exploded assembly view of the hub of FIG. 6.
Figure 9:
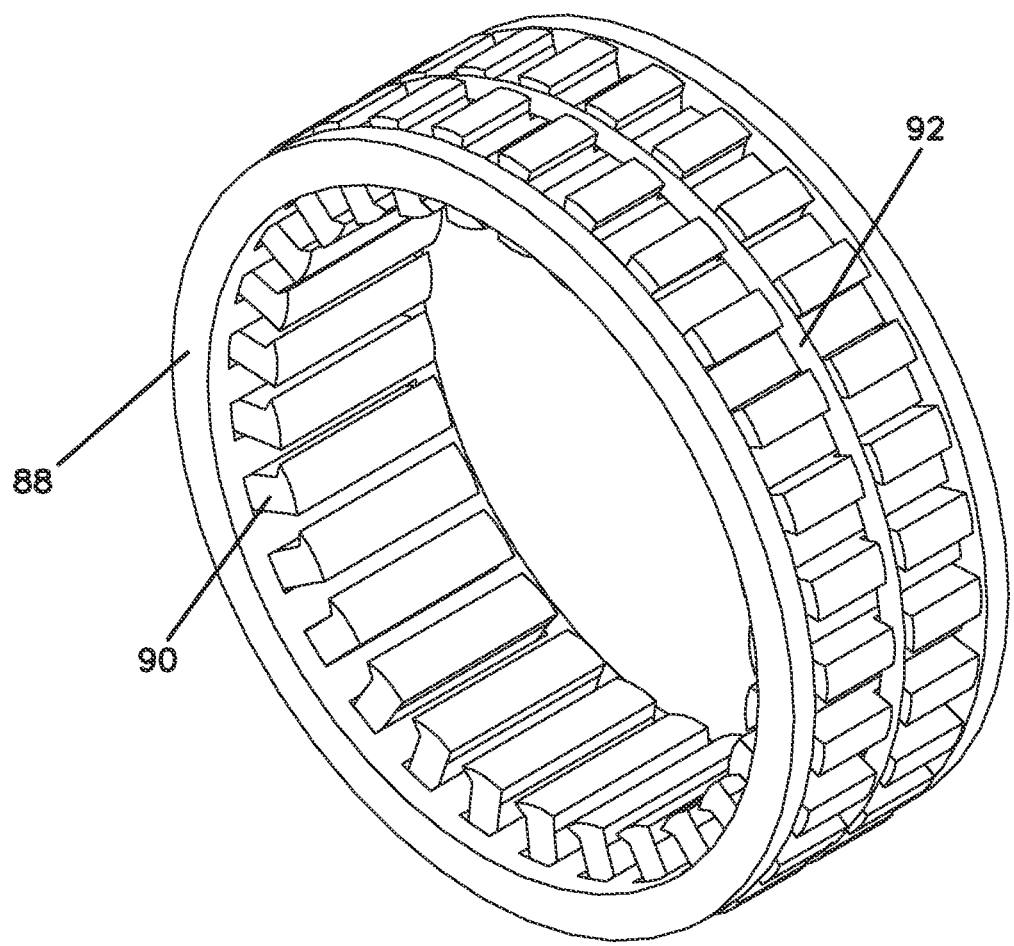
FIG. 9 is an enlarged view of a portion of FIG. 5.

Referring to FIGS. 6-8, an alternative embodiment of the hub according to the present disclosure is shown. In the depicted embodiment the hub is configured for a single speed bicycle such as a bmx bike. One of ordinary skill in the art would recognized that this embodiment includes many of the same features discussed above, therefore this embodiment will not be described separately detail herein.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A bicycle hub comprising:
   a one-piece hub body defining longitudinal rotational axis, the hub body including an internal cavity that extends from a first end of the hub body to an opposed second end of the hub body, the hub body including an external surface defining a first radially extending spoke support flange located at the first end of the hub body and a second radially extending spoke support flange located at the second end of the hub body and a body portion extended therebetween, wherein the internal cavity of the hub body defines a first internal cylindrical surface defined by a first constant diameter located at the first end of the hub body, a second internal surface adjacent the first internal surface, a third internal cylindrical surface defined by a second constant diameter located adjacent the second internal surface;
   an axle including a first end portion and a second end portion, the axle extending through the internal cavity of the hub body in a coaxial arrangement;
   a first bearing set located at the first end portion of the axle configured to interface between the axle and the first internal cylindrical surface of the hub body to facilitate relative rotation between the axle and the hub body;
   a cassette driver including a longitudinal rotational axis arranged coaxially with the longitudinal rotational axis of the hub body, the cassette driver including an internal cavity that extends from a drive end to an opposed driven end, wherein the drive end includes:
      an annular opening positioned within the hub body and terminating at a distal end, the distal end located between the first and second radially extending spoke support flanges, the second end portion of the axle extending through the annular opening;
      a first external cylindrical surface located at a first radial distance from the longitudinal rotational axis of the cassette driver, the first external cylindrical surface radially overlapping the third internal cylindrical surface of the hub body;
      a second external cylindrical surface located at a second radial distance from the longitudinal rotational axis of the cassette driver, the second radial distance being larger than the first radial distance, the second external cylindrical surface being closer to the driven end of the cassette driver than the first external cylindrical surface, wherein the second external cylindrical surface is harder than the surface of the internal cavity of the hub body and has a surface finish of less than or equal to Rz of 2.5 micrometers; and
      a third external cylindrical surface located at a third radial distance from the longitudinal rotational axis of the cassette driver, the third radial distance being larger than the second radial distance, the third external cylindrical surface being closer to the driven end than the second external cylindrical surface;
   a second bearing set located at the second end portion of the axle, the second bearing set configured to interface between the axle and the internal cavity of the cassette driver to facilitate relative rotation between the axle and the cassette driver;
   a third bearing set located between the first external cylindrical surface of the driven end of the cassette driver and the third internal surface of the hub body to facilitate relative rotation between the cassette driver and the hub body;
   a fourth bearing set located between the third external cylindrical surface of the driven end of the cassette driver and the hub body configured to facilitate relative rotation between the cassette driver and the hub body;
   a sprag sleeve pressed into the hub body in radial alignment with a portion of the second external cylindrical surface of the driven end of the cassette driver, wherein the sprag sleeve has a cylindrical internal surface that is harder than the surface of the internal cavity of the hub body; and
   an annular sprag cage having a plurality of sprags that are tension biased directly against the second external cylindrical surface of the driven end of the cassette driver and radially aligned with the sprag sleeve.

2. The hub of claim 1, wherein the second internal surface of the hub body is tapered and wherein a thickness of the hub body at the third internal surface of the hub body is greater than the thickness of the hub body at the second internal surface.

3. The hub of claim 1, wherein the internal cavity of the hub body includes a fourth internal cylindrical surface defined by a third constant diameter located adjacent the third internal cylindrical surface, the third diameter being larger than the second constant diameter, wherein the second external surface of the cassette driver radially overlapping the fourth internal cylindrical surface of the hub body and wherein the fourth bearing set is located between the third external cylindrical surface of the driven end of the cassette driver and the fourth internal surface of the hub body.

4. The hub of claim 1, wherein the sprag sleeve has an inner facing annular groove configured to receive a snap ring for retaining the sprag cage.

5. The hub of claim 1, wherein the fourth bearing set is limited axially by an annular shoulder on the cassette driver and an annular rim of the sprag sleeve.

6. The hub of claim 1, wherein the sprag cage, sprags, and sprag sleeve are arranged and configured such that the hub fully engages within less than one degree relative to drive rotation between the cassette driver and the hub body.

7. The hub of claim 1, wherein the sprag cage is configured to rotate with the cassette driver and can rotate relative to the hub body.

8. The hub of claim 1, wherein the sprags are in engagement with the second external surface such that the sprag cage and sprags rotates with the cassette driver relative to the hub body.

9. The hub of claim 1, wherein internal ends of the sprags contact the second external surface of the cassette driver and are biased radially outwardly against a spring and extend radially beyond a periphery edge of the sprag cage.

10. The hub of claim 1, wherein the sprag sleeve overlaps the second radially extending flange in the radial direction.

11. The hub of claim 1, wherein thickness of the hub wall is on average greater in the areas radially adjacent the driven end of the cassette driver than in the areas not radially adjacent the driven end of the cassette driver.

12. A bicycle hub comprising:
a hub body including an annular internal cavity that extends from a first end of the hub body to a second end of the hub body;
a cassette driver including a drive end and a driven end, the drive end being received within the second end of the hub body, the drive end of the cassette body including a stepped outer profile, the drive end of the cassette body including a first bearing interfacing cylindrical surface located adjacent a distal end of the second end of the cassette driver having a first diameter, a first sprag interfacing cylindrical surface that is coaxially arranged with the annular internal cavity of the hub body located adjacent the first bearing interfacing cylindrical surface and including a second diameter that is larger than the first diameter, a second bearing interfacing cylindrical surface located adjacent the first sprag interfacing cylindrical surface and including a third diameter that is larger than the second diameter;
a bearing assembly configured to enable relative rotation between the hub body, the cassette driver, and an axle that extends through the hub body and the cassette driver;
a cylindrical sprag sleeve that is press fitted into the annular internal cavity of the hub body, the sprag sleeve defining a second sprag interfacing cylindrical surface; and
a plurality of sprags located between the cylindrical sprag sleeve and the first sprag interfacing cylindrical surface, the sprags being in contact with and slidable relative to both the first sprag interfacing cylindrical surface and the second sprag interfacing cylindrical surface, the sprags being biased against the first sprag interfacing cylindrical surface such that the sprags rotate with the cassette driver while sliding relative to the cylindrical sprag sleeve while the hub is in a freewheeling state.

13. The hub of claim 12, wherein the bearing assembly includes:
a first bearing set interfacing between the axle and the first end of the hub body;
a second bearing set interfacing between the axle and an internal surface of the cassette driver to facilitate relative rotation between the axle and the cassette driver;
a third bearing set located between the first bearing interfacing cylindrical surface and the hub body; and
a fourth bearing set located between the second bearing interfacing cylindrical surface and the hub body.

14. The hub of claim 12, wherein surfaces of the sprag interfacing cylindrical surface and the sprag sleeve have a Rockwell hardness of 60 or greater and wherein the Rockwell hardness of the hub body is less than 60.

15. The hub of claim 12, wherein the driven end of the cassette driver and the annular internal cavity of the hub body cooperatively define a first annular cavity on a first side of the plurality of sprags and a second annular cavity on a second opposed side of the plurality of sprags, wherein the annular cavities are configured to receive bearing sets that interface between the hub body and the cassette driver and facilitate relative rotation therebetween.

16. The hub of claim 15, wherein the bearing sets on either side of the plurality of sprags are positioned between a bearing set that interfaces between the hub body and a central axle and another bearing set that interfaces between the cassette driver and the central axle.

17. The hub of claim 16, wherein the space between the first sprag interfacing cylindrical surface and the sprag sleeve is maintained constant during operation and the sprag's engagement delay remains less than one degree even when the torque load applied via the cassette driver and load on the hub via the axle varies.

18. The hub of claim 17, wherein the cassette driver includes an internal cavity including three coaxial cylindrical surfaces defined by three different diameters.

19. The hub of claim 12, wherein the first sprag interfacing cylindrical surface is one of at least three coaxial cylindrical surfaces of the drive end of the cassette driver and wherein the sprag interfacing cylindrical surface is between the two other coaxial cylindrical surfaces.

20. A bicycle hub comprising:
a hub body including a first end and a second end and an external body portion extending therebetween, the hub body including a one-piece unitary construction with an internal through cavity, the first end of the hub body including a first spoke flange in radial coaxial alignment with a first bearing interfacing surface, the second end of the hub body including a second spoke flange in radial coaxial alignment with a second bearing interfacing surface, the hub body including a bearing support portion between the first end and the second end that is coincident with the maximum hub wall thickness of the hub body located between the first and second spoke flanges, the hub body including a sprag sleeve interfacing surface adjacent the bearing support portion;
a cassette driver including a drive end and a driven end, the drive end being received within the second end of the hub body, the second end of the hub body including a stepped outer profile including a first bearing interfacing cylindrical surface that radially overlaps the bearing support portion of the hub body and located adjacent a distal end of the second end of the cassette driver having a first diameter, a first sprag interfacing cylindrical surface that is coaxially arranged with an annular internal cavity of the hub body located adjacent the first bearing interfacing cylindrical surface and including a second diameter that is larger than the first diameter;

an axle that extends through the hub body and the second end of the cassette driver, wherein an external surface of the axle is exposed to the hub body;

a first bearing interfacing between the axle and the first bearing interfacing surface of the hub body;

a second bearing interfacing between the axle and an internal surface of the cassette driver to facilitate relative rotation between the axle and the cassette driver, the second bearing located in a portion of the cassette driver that is external of the hub body, wherein the portion of the cassette driver received within the hub body is coaxially arranged and spaced away from the axle;

a third bearing set located between the bearing support portion of the hub body and the first bearing interfacing cylindrical surface of the cassette driver;

a fourth bearing set located between the second bearing interfacing surface of the hub body and the cassette driver;

a cylindrical sprag sleeve that is press fitted into the sprag sleeve interfacing surface of the hub body, the sprag sleeve defining a second sprag interfacing cylindrical surface; and a plurality of sprags located between the cylindrical sprag sleeve and the first sprag interfacing cylindrical surface, the sprags being in contact with and slidable relative to both the first sprag interfacing cylindrical surface of the cassette driver and the second sprag interfacing cylindrical surface of the sprag sleeve, the sprags being biased against the first sprag interfacing cylindrical surface of the cassette driver such that the sprags rotate with the cassette driver while sliding along in constant contact with the second sprag interfacing cylindrical surface of the sprag sleeve while the hub is in a freewheeling state.

21. The hub of claim 20, wherein the external body portion of the hub is tapered and wherein the internal surface of the hub has a conical shaped portion extending from the first end towards the second end defined by an increasing diameter from the first end towards the second end.

22. The hub of claim 20, wherein the cassette driver further comprises a second bearing interfacing cylindrical surface located adjacent the first sprag interfacing cylindrical surface and radially overlapping the second spoke flange and including a third diameter that is larger than the second diameter and wherein the fourth bearing set is located between the second bearing interfacing surface of the hub body and the second bearing interfacing cylindrical surface of the cassette driver.

* * * * *